(12) United States Patent
Kanno

(10) Patent No.: US 7,657,944 B2
(45) Date of Patent: Feb. 2, 2010

(54) DATA DISTRIBUTION SYSTEM AND DATA DISTRIBUTION APPARATUS

(75) Inventor: Hiroshi Kanno, Amagasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 914 days.

(21) Appl. No.: 11/051,026

(22) Filed: Feb. 3, 2005

(65) Prior Publication Data
US 2005/0172341 A1 Aug. 4, 2005

(30) Foreign Application Priority Data
Feb. 4, 2004 (JP) ............................. 2004-028597

(51) Int. Cl.
G06F 7/04 (2006.01)
G06F 21/00 (2006.01)
(52) U.S. Cl. .......................................... 726/27; 705/51
(58) Field of Classification Search .................. 726/26, 726/25, 27; 705/51
See application file for complete search history.

(56) References Cited

U.S. PATENT DOCUMENTS

| | | | | |
|---|---|---|---|---|
| 5,481,720 | A * | 1/1996 | Loucks et al. .................. | 726/21 |
| 7,024,556 | B1 * | 4/2006 | Hadjinikitas et al. ........ | 713/168 |
| 7,444,368 | B1 * | 10/2008 | Wong et al. .................. | 709/200 |
| 2002/0194130 | A1 * | 12/2002 | Maegawa et al. ............. | 705/51 |
| 2003/0079144 | A1 * | 4/2003 | Kakemizu et al. ........... | 713/200 |
| 2004/0073808 | A1 * | 4/2004 | Smith et al. .................. | 713/200 |
| 2004/0117500 | A1 * | 6/2004 | Lindholm et al. ........... | 709/231 |
| 2006/0064589 | A1 * | 3/2006 | Taniguchi et al. ........... | 713/170 |

FOREIGN PATENT DOCUMENTS

| | | |
|---|---|---|
| JP | 11-232360 | 8/1999 |
| JP | 2000-029830 | 1/2000 |
| JP | 2000-032205 | 1/2000 |
| JP | 2000-267834 | 9/2000 |
| JP | 2002-269043 | 9/2002 |
| JP | 2003-167854 | 6/2003 |

* cited by examiner

*Primary Examiner*—Kambiz Zand
*Assistant Examiner*—Teshome Hailu
(74) *Attorney, Agent, or Firm*—David G. Conlin; Steven M. Jensen; Edwards Angell Palmer & Dodge LLP

(57) ABSTRACT

A data distribution apparatus installed in a data center transmits data to a data acquisition apparatus installed in a store via a communication network. The data acquisition apparatus receives authentication information, such as the fingerprint, ID card or the like of a user, for user authentication, and the data distribution apparatus authenticates the user according to the authentication method selected from among multiple authentication methods and corresponding to the authentication information received by the data acquisition apparatus. The data distribution apparatus transmits data changed in format according to the authentication method used to the data acquisition apparatus. In the case of an authentication method being high in security, data is made changeable, and in the case of an authentication method being lower in security, data is changed so as to have an unchangeable format, whereby the unauthorized use of data is prevented.

15 Claims, 14 Drawing Sheets

FIG. 3

DATA NAME : ○○○○
LEVEL OF IMPORTANCE : 5

| AUTHENTICATION METHOD | DATA DISTRIBUTION FORMAT | IMAGE DISTRIBUTION FORMAT | SETTLEMENT METHOD |
|---|---|---|---|
| FINGERPRINT + ID CARD | WITHOUT CONVERSION | WITHOUT CONVERSION | CHARGE |
| ID CARD + PASSWORD | ENCRYPTION | TINT BLOCK | CHARGE |
| ID CARD | CONVERSION INTO IMAGE DATA + PROTECTION BY PASSWORD | TINT BLOCK + SIZE REDUCTION | CASH |
| PASSWORD | PROHIBITION OF DISTRIBUTION | TINT BLOCK + SIZE REDUCTION + RESOLUTION REDUCTION | CASH |

DATA NAME : ○○×x
LEVEL OF IMPORTANCE : 1

FIG. 4

| USER NAME | LEVEL OF IMPORTANCE OF DISTRIBUTABLE DATA |
|---|---|
| ○○○○ | 1-5 |
| ××× × | 1-2 |
| | |

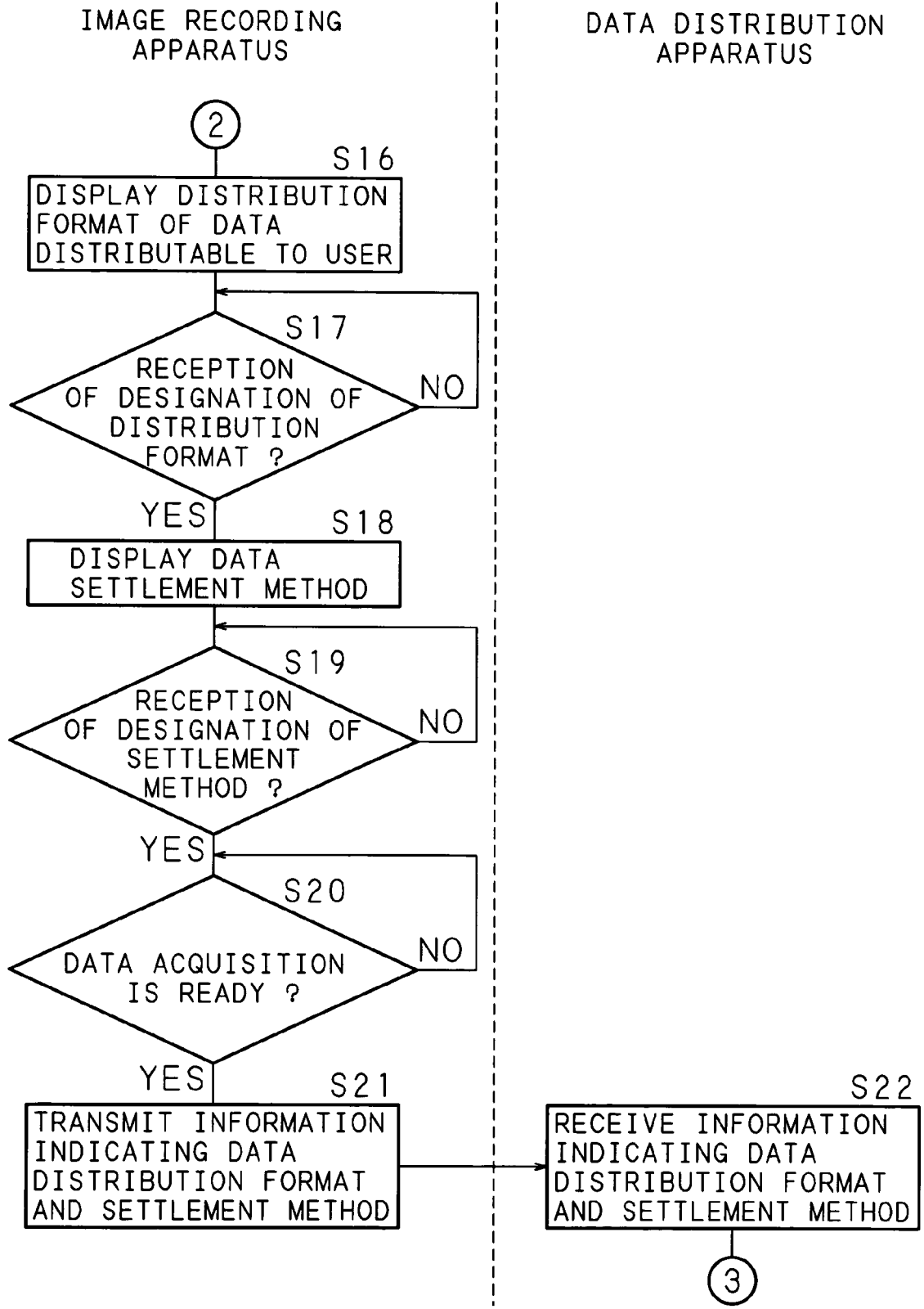

FIG. 8

```
PERFORM AUTHENTICATION OPERATION.
FINGERPRINT, ID CARD AND PASSWORD
CAN BE USED IN THIS APPARATUS.
(MULTI-SELECTION PERMITTED)
```

FIG. 9A

DESIGNATED DATA CAN BE
DISTRIBUTED BY

PRINTING    DATA FILE

DESIGNATE DISTRIBUTION
FORMAT

FIG. 9B

DESIGNATED DATA CAN BE
DISTRIBUTED BY

PRINTING    DATA FILE

DESIGNATE DISTRIBUTION
FORMAT

FIG. 11A

DESIGNATED DATA CAN BE
PRINTED BY

| NO LIMITATION |

| TINT BLOCK FOR COPY PREVENTION |

| TINT BLOCK AND SIZE REDUCTION |

| TINT BLOCK, SIZE REDUCTION AND RESOLUTION REDUCTION |

DESIGNATE PRINTING FORMAT

FIG. 11B

DESIGNATED DATA CAN BE
PRINTED BY

| NO LIMITATION |

| TINT BLOCK FOR COPY PREVENTION |

| TINT BLOCK AND SIZE REDUCTION |

| TINT BLOCK, SIZE REDUCTION AND RESOLUTION REDUCTION |

DESIGNATE PRINTING FORMAT

DATA DISTRIBUTION SYSTEM AND DATA DISTRIBUTION APPARATUS

CROSS-REFERENCE TO RELATED APPLICATIONS

This Nonprovisional application claims priority under 35 U.S.C. §119(a) on Patent Application No. 2004-28597 filed in Japan on Feb. 4, 2004, the entire contents of which are hereby incorporated by reference.

BACKGROUND OF THE INVENTION

The present invention relates to a data distribution system and a data distribution apparatus that distributes data via a communication network after user authentication.

Japanese Patent Application Laid-open No. 2002-32205 discloses a network printing system comprising a server connected to a communication network, a terminal requesting data storage and multiple printers. When the terminal requests the server to store data, this system issues the identification data of the data to be stored. A user requests data by inputting the identification data in a printer installed in a store, such as a convenience store or a stationery store, on a city street. The data transmitted from the server via the communication network is printed by the printer, whereby the user acquires the data. Furthermore, this system includes a technology for carrying out charging processing according to the capacity and storage time of the data stored.

Such a technology as described above is known wherein a wide area communication network, such as the Internet, is used, data has been stored in the server, and an image recording apparatus, such as a copier, installed at a destination of the user acquires data from the server via the communication network, and thereby can record the image of the data. With this kind of technology, necessary data, such as business documents, has been stored in the server beforehand, and the user whose location is uncertain, such as a businessperson who travels to visit customers, can acquire necessary data as necessary using the image recording apparatus installed in a store on a city street. When data is distributed using this kind of technology, user authentication is required to be carried out to prevent the unauthorized use of data. As methods for user authentication, inputting the password of the user, inputting the information on the ID card carried by the user, etc. are used generally.

In addition, a technology is known wherein various fees are settled via a communication network. Japanese Patent Application Laid-open No. 11-232360(1999) discloses a technology wherein the information recorded on the user's ID card is captured via a communication network, and public utility fees are settled by the deduction of the public utility fees from the user's salary.

As methods for personal authentication, various methods are known, for example, a method wherein personal memory using a password or the like is used, a method wherein personal possession using an ID card, a seal or the like is used, and a method wherein personal biometric information using the pattern of a fingerprint, a retina or the like is used. These various authentication methods differ from one another in the capability of preventing personal identity theft, that is, security. The method wherein an ID card is used is higher in security than the method wherein a password is used. The method wherein a fingerprint is used is higher in security than the method wherein an ID card is used. Hence, for the protection of data to be distributed via a communication network, it is conceivable that data of higher importance should be distributed only when the user is authenticated by an authentication method being higher in security. However, the use of the authentication method being higher in security is limited by time and location because of the necessity of using special devices or other reasons. Furthermore, the authentication method being higher in security is characterized in that the number of users who can be authenticated is limited. For these reasons, the advantage of the technology of distributing data via a communication network, that is, the advantage wherein necessary data can be acquired as necessary, is impaired.

BRIEF SUMMARY OF THE INVENTION

In consideration of the above-mentioned circumstances, the present invention is intended to provide a data distribution system and a data distribution apparatus wherein, while user authentication is made possible using multiple authentication methods, data distribution is carried out using a method corresponding to the authentication method utilized, for example, in the case that an authentication method being high in security is used, data is distributed without limitation, and in the case that an authentication method being lower in security is used, data is distributed in a format changed so that the unauthorized use of data is difficult, whereby the convenience of data utilization is improved while the unauthorized use of data is prevented.

The data distribution system in accordance with the present invention comprises a data distribution apparatus, provided with storage means in which data is stored, for distributing data stored in the storage means, and a data acquisition apparatus for acquiring the data distributed from the data distribution apparatus, wherein the data acquisition apparatus comprises means for receiving an authentication information of a user and means for transmitting the received authentication information to the data distribution apparatus, and the data distribution apparatus comprises authenticating means for authenticating the user using the authentication method selected from among multiple authentication methods and corresponding to the authentication information received from the data acquisition apparatus, selecting means for selecting a format of data to be distributed according to the authentication method used by the authenticating means, and means for transmitting the data in the format selected by the selecting means to the data acquisition apparatus in the case that the user is authenticated by the authenticating means.

The data distribution apparatus in accordance with the present invention, provided with storage means in which data is stored, for distributing data stored in the storage means, comprises authenticating means for authenticating a user using one of multiple authentication methods, selecting means for selecting a format of data to be distributed according to the authentication method used by the authenticating means, and distributing means for distributing the data stored in the storage means in the format selected by the selecting means to the outside in the case that the user is authenticated by the authenticating means.

In the present invention, multiple authentication methods are made usable for the authentication of the user at the time of data distribution, and the data distribution apparatus distributes data in the format corresponding to the authentication method utilized. Hence, the prevention of the unauthorized use of data and the improvement in the convenience of data utilization can be attained simultaneously.

The authenticating means of the data distribution apparatus in accordance with the present invention carries out user authentication using one of multiple authentication methods being different in security against personal identity theft. While multiple authentication methods being different in security against personal identity theft are made usable, in the case that an authentication method being high in security is used, data is distributed in changeable formats, and in the case that an authentication method being lower in security is used, data is distributed in a format changed so that the unauthorized use of data is difficult, whereby the unauthorized use of data can be prevented. Furthermore, provided that data has a format wherein the unauthorized use of data is difficult, even if the user is authenticated using a simpler method being low in security, data distribution is carried out, whereby more users can utilize data simply and easily, and the convenience of data utilization is improved.

The authenticating means of the data distribution apparatus in accordance with the present invention carries out user authentication using a combination of multiple authentication methods. Since user authentication is carried out using a combination of multiple authentication methods, security against personal identity theft can be raised further.

The data distribution apparatus in accordance with the present invention further comprises means for converting the format of data to be distributed according to the result selected by the selecting means. The format of data to be distributed is converted according to the authentication method utilized. The data distribution apparatus in accordance with the present invention further comprises means for protecting data to be distributed using a password according to the result selected by the selecting means. The data to be distributed is protected using a predetermined password according to the authentication method utilized. The data distribution apparatus in accordance with the present invention further comprises means for encrypting data to be distributed according to the result selected by the selecting means. The data to be distributed is encrypted according to the authentication method utilized. In the present invention, the format of data is changed to, for example, a data format wherein the contents of the data are unchangeable, the data to be distributed is protected using a password or the data format is changed by data encryption according to the user authentication method, whereby it is possible to prevent the unauthorized use of data owing to personal identity theft in the case that an authentication method being low in security is used or owing to the case that a recording medium with stored data is left and stolen.

The data distribution apparatus in accordance with the present invention, wherein the distributing means distributes image data required when data to be distributed is recorded as an image, further comprises means for adding predetermined image data to the image data according to the result selected by the selecting means. In the case that data is distributed as image data required when data to be distributed is recorded as an image, predetermined image data, such as a tint block for copy prevention, is added to the image data to be distributed according to the authentication method utilized. In the case that data is recorded as an image, this kind of predetermined image is added according to the user authentication method, whereby the unauthorized use of data can be suppressed.

The data distribution apparatus in accordance with the present invention, wherein the distributing means distributes image data required when data to be distributed is recorded as an image, further comprises means for converting an image at least in color, size or resolution according to the result selected by the selection means when the image data is recorded as an image. In the case that data is distributed as image data required when the data is recorded as an image, the image is converted at least in color, size or resolution according to the authentication method utilized. In the case that data is recorded as an image, the image is converted in color, size or resolution according to the user authentication method, whereby it is possible to prevent the unauthorized use of data owing to personal identity theft in the case that an authentication method being low in security is used or owing to the case that an image recording medium is left and stolen.

The data distribution apparatus in accordance with the present invention further comprises means for storing the result of user authentication carried out by the authenticating means and the distribution result of data stored in the storage means. Since the result of user authentication and the distribution result of data are stored, the utilization state of data can be managed.

The data distribution apparatus in accordance with the present invention further comprises settling means for settling the distribution fee for the data distribution carried out by the distributing means according to a settlement method corresponding to the authentication method carried out by the authenticating means. Data distribution fee is settled according to the settlement method corresponding to the authentication method utilized. Data distribution fee is settled according to the settlement method corresponding to the user authentication method utilized, for example, in the case that an authentication method being high in security against personal identity theft is used, the settlement is carried out online, and in the case that an authentication method being lower in security is used, the settlement is carried out in cash, whereby the convenience of the settlement can be improved while the security against unauthorized settlement is ensured.

The data distribution apparatus in accordance with the present invention further comprises means for informing the settlement method carried out by the settling means to the outside. Since the settlement method for the data distribution fee is made known to the user, the settlement amount of the distribution fee is confirmed by the user.

The data distribution apparatus in accordance with the present invention further comprises means for storing the result of settlement of the distribution fee carried out by the settling means. Since the result of the data distribution fee settlement is stored, the settlement state of the distribution fee can be managed.

The above and further objects and features of the invention will more fully be apparent from the following detailed description with accompanying drawings.

BRIEF DESCRIPTION OF THE SEVERAL VIEWS OF THE DRAWINGS

FIG. 3 is a conceptual diagram showing an example of the contents of condition information;

FIG. 4 is a conceptual diagram showing an example of contents of user information;

FIGS. 7A and 7B are flowcharts showing the procedure of the processing carried out by the data distribution system in accordance with the present invention;

FIG. 8 is a schematic diagram showing an example of an authentication request displayed on the display device of an operation section;

FIGS. 9A and 9B are schematic diagrams showing display examples of the distribution format of the distributable data displayed on the touch panel of the operation section;

FIGS. 11A and 11B are schematic diagrams showing display examples of the distribution format of the distributable data displayed on the touch panel of the operation section.

DETAILED DESCRIPTION OF THE INVENTION

The present invention will be described below specifically on the basis of the drawings showing embodiments thereof.

Figure 1:
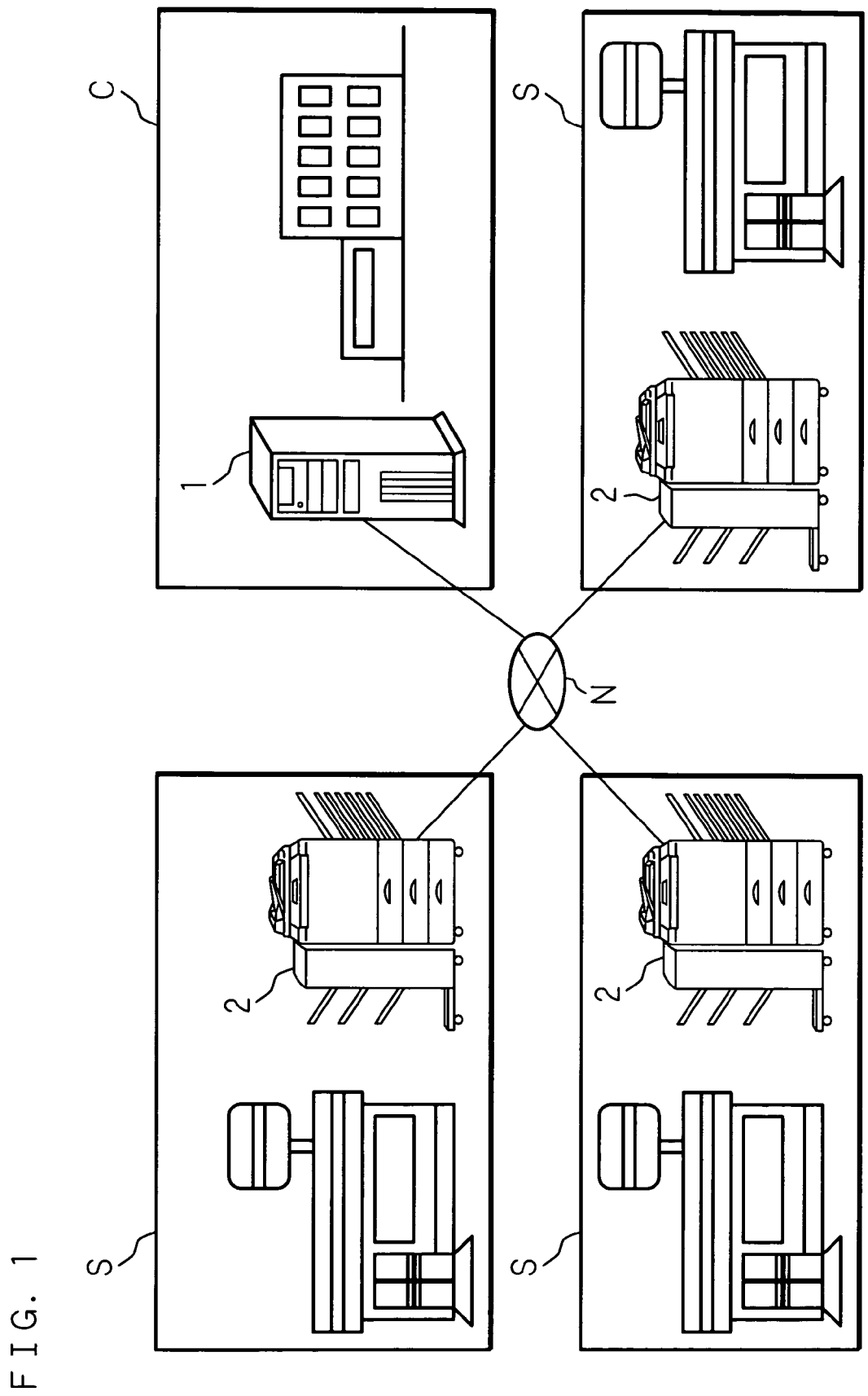
FIG. 1 is a block diagram showing a configuration example of a data distribution system in accordance with the present invention.

FIG. 1 is a block diagram showing a configuration example of a data distribution system in accordance with the present invention. A data distribution apparatus 1 in accordance with the present invention is a server for managing various data and installed in a data center C managed by a business establishment. The data distribution apparatus 1 is connected to a communication network N, such as the Internet. In addition, multiple image recording apparatuses 2, 2, . . . serving as data acquisition apparatuses in accordance with the present invention are connected to the communication network N. The image recording apparatus 2 is installed in a store S, such as a convenience store or a stationery store, on a city street. The data distribution apparatus 1 in accordance with the present invention authenticates the user of the image recording apparatus 2, and distributes data having the format corresponding to the method of the authentication to the image recording apparatus 2 via the communication network N.

Figure 2:
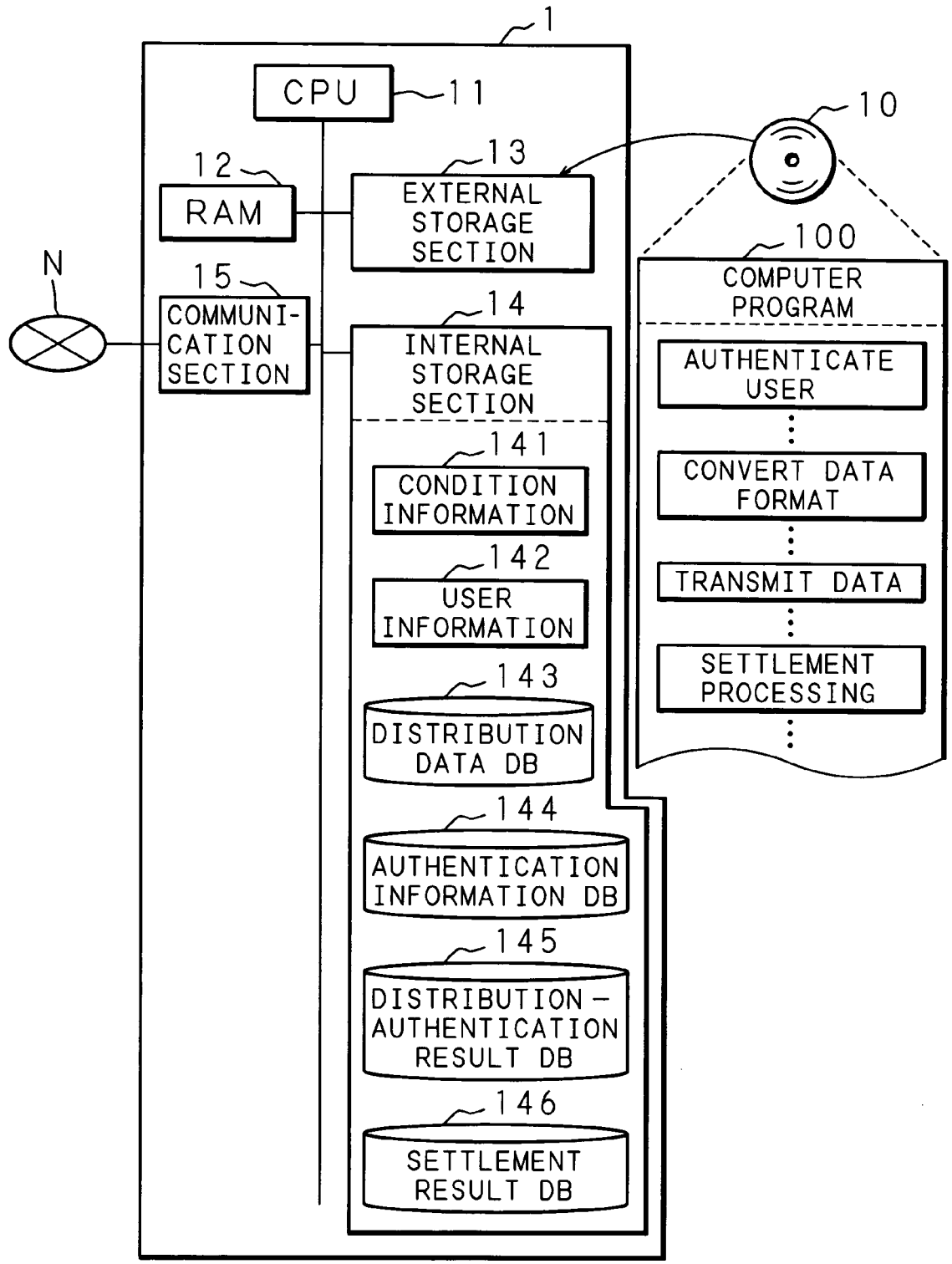
FIG. 2 is a functional block diagram showing the internal functional configuration of a data distribution apparatus in accordance with the present invention.

FIG. 2 is a functional block diagram showing the internal functional configuration of the data distribution apparatus 1 in accordance with the present invention. The data distribution apparatus 1, formed of a server, comprises a CPU 11 for carrying out calculation, a RAM 12 for storing temporary information generated in association with the calculation, an external storage section 13, such as a CD-ROM drive, an internal storage section 14, such as a hard disk drive, and a communication section 15 for transmitting and receiving information and data via the communication network N. The CPU 11 reads computer programs 100 from a recording medium 10, such as a CD-ROM disc, using the external storage section 13, and stores the computer programs 100 having been read into the internal storage section 14. The computer programs 100 are loaded from the internal storage section 14 to the RAM 12 as necessary. On the basis of the computer programs 100 loaded, the CPU 11 carries out necessary processing for the data distribution apparatus 1.

The internal storage section 14 has stored distribution data DB 143 in which data to be distributed from the data distribution apparatus 1 to the image recording apparatuses 2, 2, . . . is recorded and authentication information DB 144 in which information, such as fingerprints, required for authenticating the users of the image recording apparatuses 2, 2, . . . is recorded. In addition, the internal storage section 14 has stored condition information 141 indicating data distribution conditions determined for respective data recorded in the distribution data DB 143 and user information 142 indicating the ranges of user usable data determined for respective users.

FIG. 3 is a conceptual diagram showing an example of the contents of the condition information 141. The level of importance of data is recorded so as to correspond to the data name of the data. For example, as the level of importance of data is higher, the data is recorded according to the numerical value information indicating that the data is more important. Furthermore, in correspondence to multiple authentication methods for user authentication at the time when the data is distributed, the following items are respectively recorded: a data distribution format indicating the format of the data when distributed as electronic data, an image distribution format indicating the format of the data when distributed to the image recording apparatus 2 as data to be recorded as an image, and a settlement method for settling the distribution fee for the distribution of the data. In the example shown in FIG. 3, in the case that the user is authenticated using both the fingerprint of the user and the ID card carried by the user, the level of security against personal identity theft is high. Hence, the format is set so that the data is distributed without conversion. Furthermore, in the case that the user is authenticated using the ID card and the password of the user, the level of security is slightly lower. Hence, when the data is distributed as electronic data, the format is set so that the data is encrypted, or when the data is distributed as an image, the format is set so that a tint block for copy prevention is added to the image and then the image is recorded by the image recording apparatus 2. Still further, in the case that the user is authenticated using only the ID card, the level of security is further lower. Hence, when the data is distributed as electronic data, the format is set so that the data is converted into image data that cannot be changed and so that the image data is protected using a password, or when the data is distributed as an image, the format is set so that a tint block for copy prevention is added to the image and then the image is reduced in size and recorded by the image recording apparatus 2. Still further, in the case that the user is authenticated using only the password, the level of security is lowest. Hence, the distribution of the data as electronic data is prohibited. When the data is distributed as an image, the format is set so that a tint block for copy prevention is added to the image and the image is reduced in size and resolution and recorded by the image recording apparatus 2. Furthermore, a settlement method for settling the data distribution fee is designated for each authentication method. The settlement methods designated herein are a settlement method wherein the settlement is carries out by charging the distribution fee to a business establishment and a settlement method wherein the settlement is carried out in cash. As described above, for example, in the case that the level of importance of data is low, in the condition information 141, distribution conditions according to the level of importance of data, such as information being set so that data distribution is carried out without conversion regardless of any authentication method, have been recorded for respective data.

FIG. 4 is a conceptual diagram showing an example of contents of the user information 142. The information indicating the level of importance of data distributable to the user is recorded so as to be associated with the name of the user. For example, in the case that the level of importance of data distributable to the user is 1 or 2, the user can receive data having the level of importance 1 or 2, but the user cannot receive data having the level of importance 3 or higher.

Figure 5:
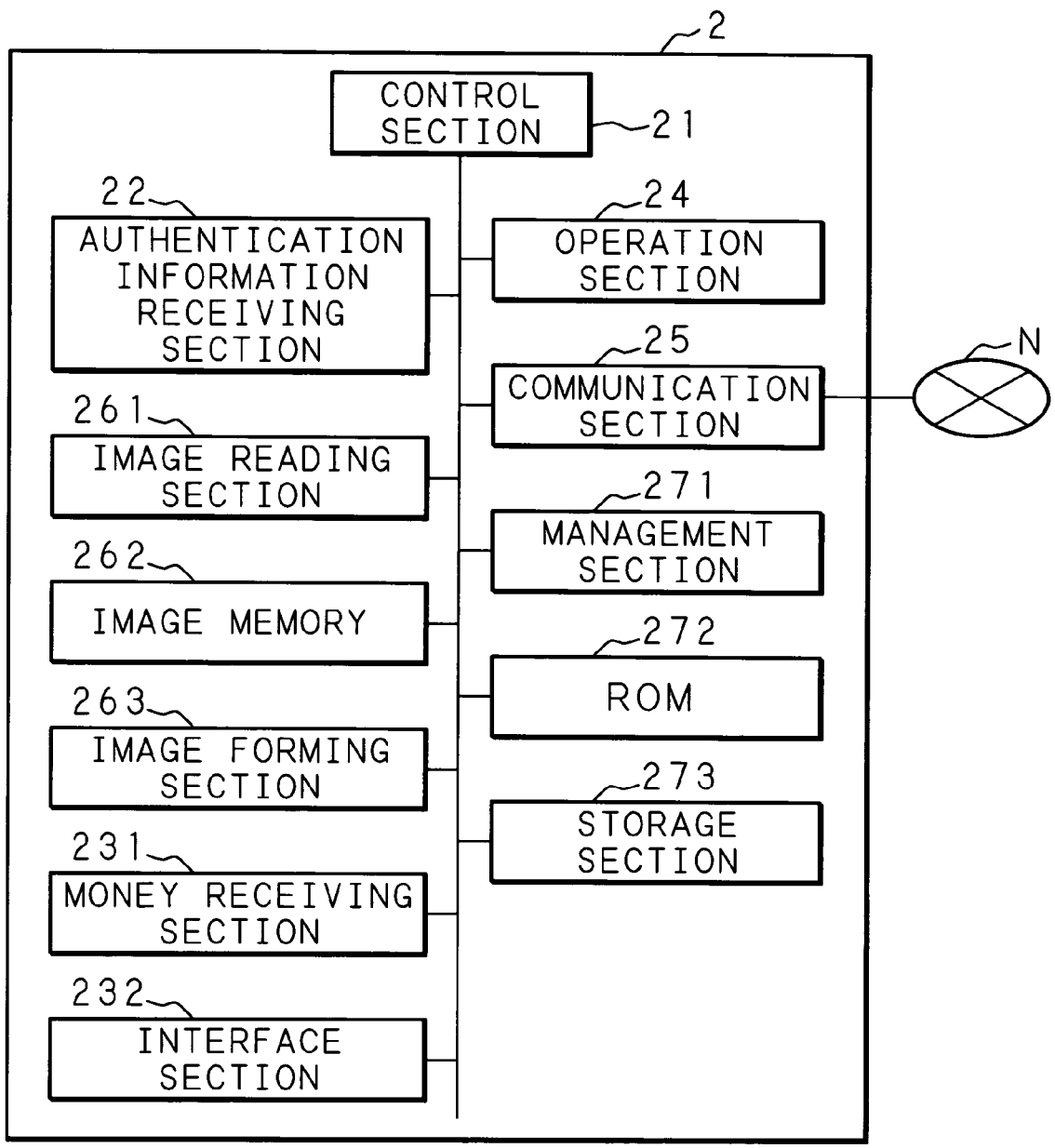
FIG. 5 is a functional block diagram showing the internal configuration of an image recording apparatus.
Figure 6A:
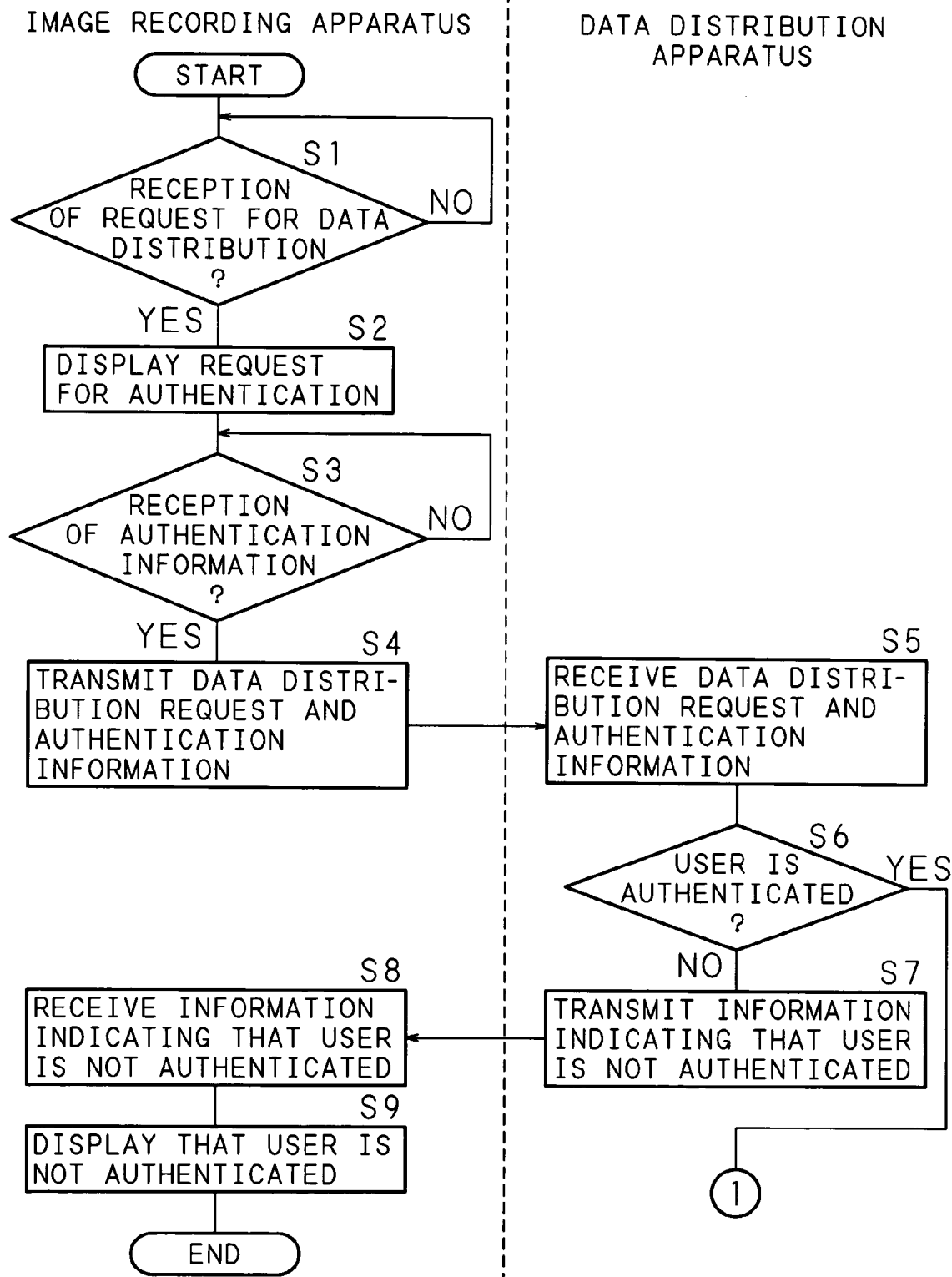
FIGS. 6A and 6B are flowcharts showing the procedure of the processing carried out by the data distribution system in accordance with the present invention.
Figure 6B:
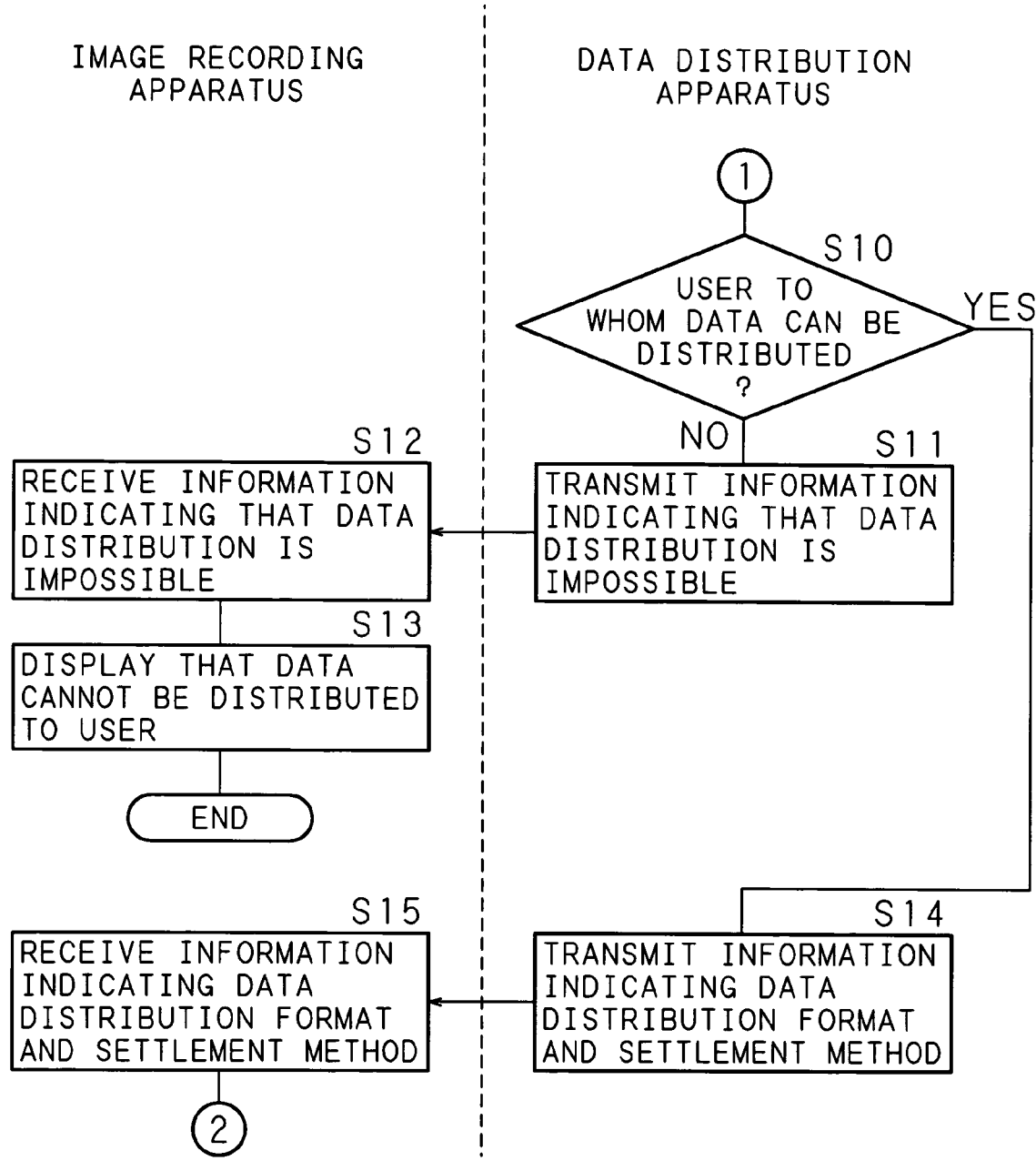
Figure 7B:
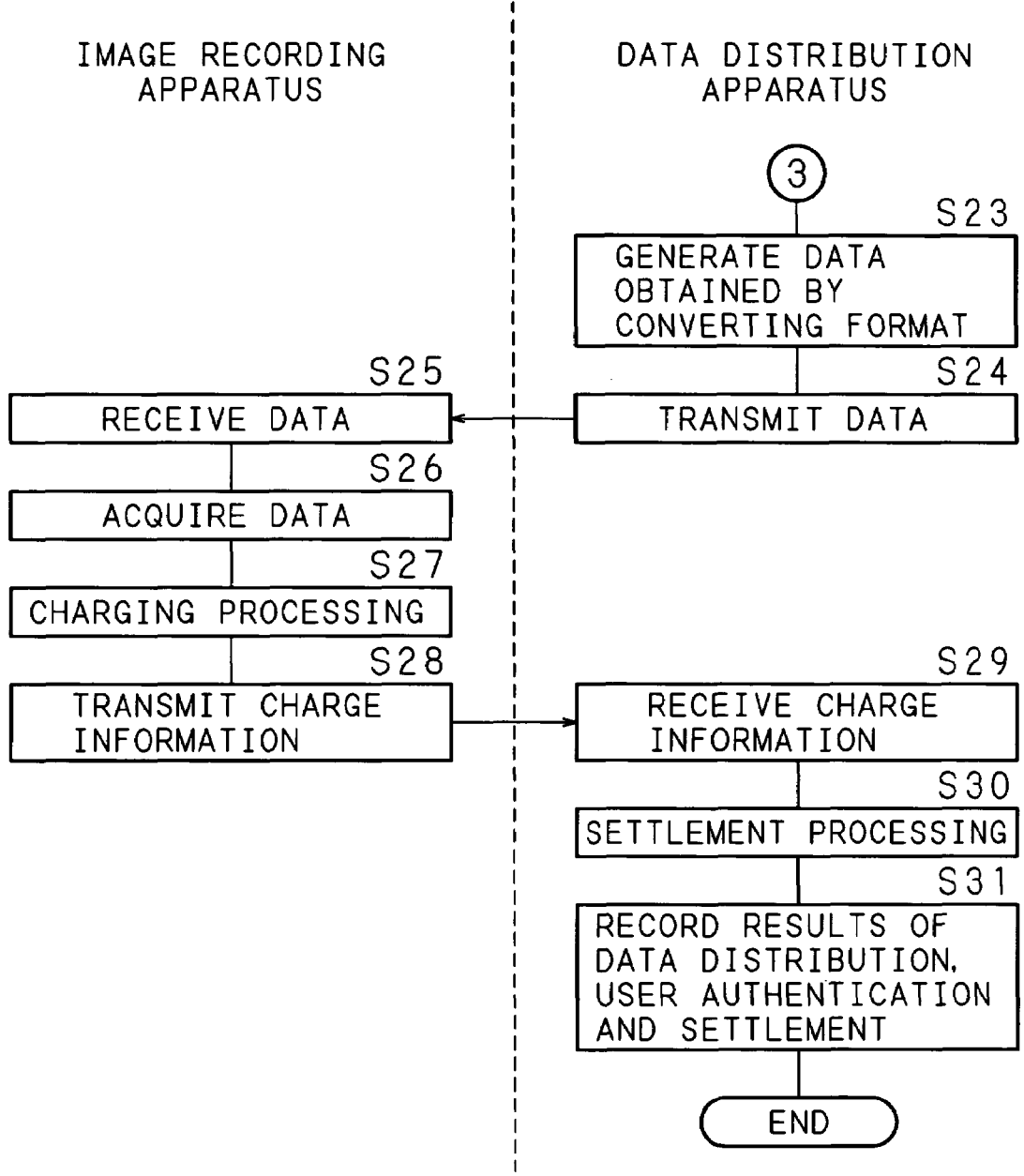

FIG. 5 is a functional block diagram showing the internal configuration of the image recording apparatus 2. The image recording apparatus 2 is a copier installed in a store S, such as a convenience store or a stationery store. The image recording apparatus 2 has a control section 21 comprising a CPU for carrying out calculation and a RAM for storing temporary information associated with the calculation. A ROM 272 in which control programs for controlling the image recording apparatus 2 are stored is connected to the control section 21. The control section 21 controls the whole of the image recording apparatus 2 according to the control programs stored in the ROM 272. In addition, a management section 271 serving as a memory section for storing management information for managing the processing to be carried out by the image recording apparatus 2 is connected to the control section 21. The control section 21 refers to the management information stored in the management section 271 and controls the image recording apparatus 2 on the basis of the information referred to.

Furthermore, an image reading section 261 for scanning and reading the image on a manuscript and for generating image data, an image memory 262 for temporarily storing the image data and an image forming section 263 are connected to the control section 21. In the data acquisition apparatus 2, a manuscript is read by the image reading section 261 and image data is generated. The generated image data is stored in the image memory 262. An image is formed from the stored image data by the image forming section 263. The formed image can be recorded and output on recording paper.

In addition, an operation section 24 that is operated by the user is connected to the control section 21. The operation section 24 comprises a display device, such as a liquid crystal panel, for displaying information required for the operation by the user, and an input device, such as a touch panel or a numeric keypad, for inputting instructions by the operation of the user. Furthermore, an authentication information receiving section 22 for receiving authentication information required for user authentication is connected to the control section 21. The authentication information receiving section 22 comprises a device for reading the fingerprint of the user or a device for reading the ID information recorded on the ID card carried by the user. Still further, a communication section 25 connected to the communication network N is connected to the control section 21. The information received by the operation section 24 and the authentication information received by the authentication information receiving section 22 are transmitted from the communication section 25 to the data distribution apparatus 1 via the communication network N. Moreover, the communication section 25 receives data distributed from the data distribution apparatus 1 via the communication network N.

In addition, a money receiving section 231 for receiving money from the user is connected to the control section 21. The money receiving section 231 is a device for receiving money, prepaid cards or the like. The control section 21 subtracts the monetary value of the money, the prepaid cards or the like received by the money receiving section 231, thereby being capable of settling the fee for the processing carried out by the image recording apparatus 2. Furthermore, an interface section 232 for outputting data to the outside is connected to the control section 21. The interface section 232 comprises a connection section for a semiconductor memory card and a connection section for connection to devices, such as drives for accommodating portable recording media, a notebook personal computer (PC) and a portable phone.

FIGS. 6A, 6B and 7A, 7B are flowcharts showing the procedure of the processing carried out by the data distribution system in accordance with the present invention. The data distribution apparatus 1 carries out the following processing according to the computer programs 100 loaded to the RAM 12, and the control section 21 of the image recording apparatus 2 carries out the following processing according to the control programs stored in the ROM 272.

The control section 21 of the image recording apparatus 2 monitors the reception of a request for the distribution of given data at the operation section 24 operated by the user (at step S1). When no request for data distribution is received (NO at step S1), the control section 21 continuously monitors the reception of a request for data distribution. When a request for data distribution is received (YES at step S1), the control section 21 causes the display device of the operation section 24 to display a request for user authentication (at step S2).

FIG. 8 is a schematic diagram showing an example of an authentication request displayed on the display device of the operation section 24. It is indicated that authentication using the fingerprint, ID card and password of the user is possible with the image recording apparatus 2 and that the user is requested to be authenticated using one of the methods. It is also indicated that the authentication can be carried out using multiple methods at this time. The authentication method that can be used by the image recording apparatus 2 differs according to the configuration of the image recording apparatus 2. It may also possible to use other authentication methods, such as a method of using the retinal pattern of the user and a method of using the driver's license of the user. In the case that the authentication information receiving section 22 is provided with functions of receiving the authentication information relating to the other authentication methods, an authentication request is displayed so that the authentication is carried out using the other methods.

Next, the control section 21 monitors the reception of one or more pieces of authentication information, such as the reading of the fingerprint of the user at the authentication information receiving section 22, the reading of the ID information recorded on the ID card carried by the user at the authentication information receiving section 22, and the reception of the password of the user at the operation section 24 (at step S3). In the case that no authentication information is received (NO at step S3), the control section 21 continuously monitors the reception of authentication information. In the case that authentication information is received (YES at step S3), the control section 21 causes the communication section 25 to transmit the received data distribution request and authentication information to the data distribution apparatus 1 via the communication network N (at step S4).

The communication section 15 of the data distribution apparatus 1 receives the data distribution request and authentication information transmitted from the image recording apparatus 2 (at step S5). The CPU 11 of the data distribution apparatus 1 compares the received authentication information with the information recorded in the authentication information DB 144, and judges whether or not the user is authenticated as the user having been registered so as to receive data distribution (at step S6). If the user is not authenticated (NO. at step S6), the CPU 11 causes the communication section 15 to transmit information indicating that the user is not authenticated to the image recording apparatus 2 (at step S7). The information indicating that the user is not authenticated, transmitted from the data distribution apparatus 1, is received by the communication section 25 of the image recording apparatus 2 (at step S8). The control section 21 causes the display device of the operation section 24 to display that the user is not authenticated (at step S9), and the processing ends.

If the user is authenticated at step S6 (YES at step S6), the CPU 11 checks the information of the data designated by the received data distribution request in reference to the condition information 141, also checks the information of the authenticated user in reference to the user information 142, and judges whether or not the user is the user to whom the designated data can be distributed (at step S10). For example, in the case that the level of importance of the designated data is stipulated as 5 in the condition information 141 and that the level of importance of the data distributable to the authenticated user is stipulated as 1 or 2 in the user information 142, it is judged that this user is not the user to whom the designated data can be distributed. If it is judged that the user is not the user to whom the designated data can be distributed (NO at step S10). The CPU 11 causes the communication section 15 to transmit information indicating that data distribution is impossible to the image recording apparatus 2 (at step S11). The communication section 25 of the image recording apparatus 2 receives the information indicating that data distribution is impossible, transmitted from the data distribution apparatus 1 (at step S12). The control section 21 causes the display device of the operation section 24 to display that the designated data cannot be distributed to the user (at step S13), and the processing ends.

If it is judged at step S10 that the user is the user to whom the designated data can be distributed (YES at step S10), the CPU 11 causes the communication section 15 to transmit information indicating the data distribution format and settlement method stipulated in the condition information 141 and corresponding to the authentication method of the user to the image recording apparatus 2 (at step S14). The image recording apparatus 2 causes the communication section 25 to receive the information indicating the data distribution format and settlement method transmitted from the data distribution apparatus 1 (at step S15) and causes the display device of the operation section 24 to display the distribution format of the data distributable to the user (at step S16).

FIGS. 9A and 9B, FIGS. 10A and 10B and FIGS. 11A and 11B are schematic diagrams showing display examples of the distribution format of the distributable data, displayed on the touch panel of the operation section 24. First, as shown in FIGS. 9A and 9B, it is indicated that the data can be distributed in one of two formats, that is, one format wherein the data is recorded as an image and the other format wherein the data is obtained as electronic data. In the case that the designated data is the data having the condition information shown in FIG. 3 and that the user has been authenticated using his or her fingerprint and ID card, the data can be distributed in both the printing and data file formats as shown in FIG. 9A. According to this kind of display, the user can select a data distribution method by designating "printing" or "data file" on the touch panel. Furthermore, in the case that the user is authenticated only by his or her password, it is indicated that the data can be distributed only in the printing format as shown in FIG. 9B.

Figure 10A:
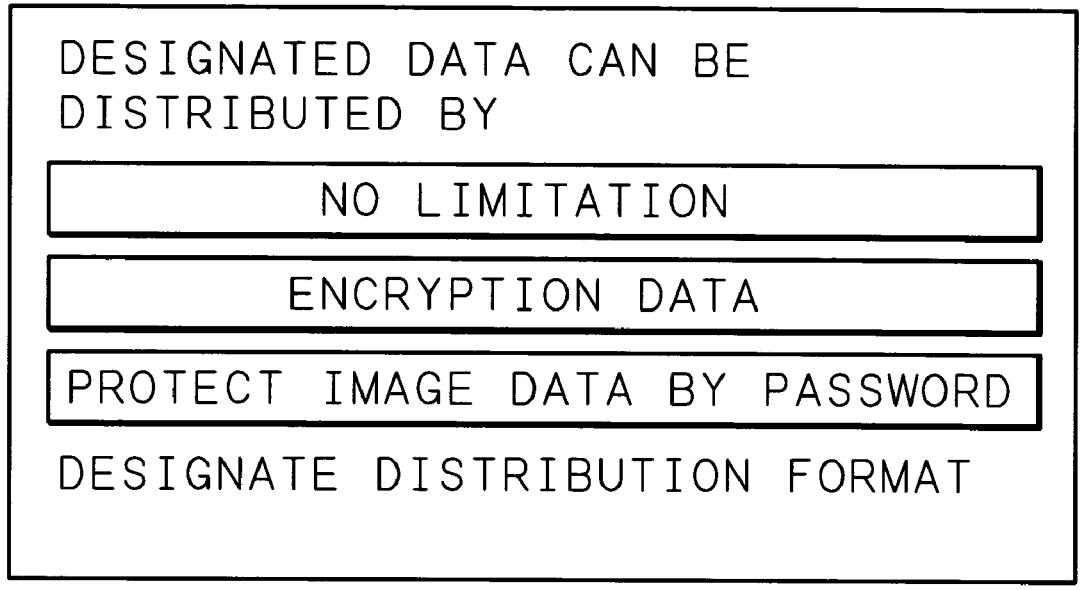
FIGS. 10A and 10B are schematic diagrams showing display examples of the distribution format of the distributable data displayed on the touch panel of the operation section.
Figure 10B:
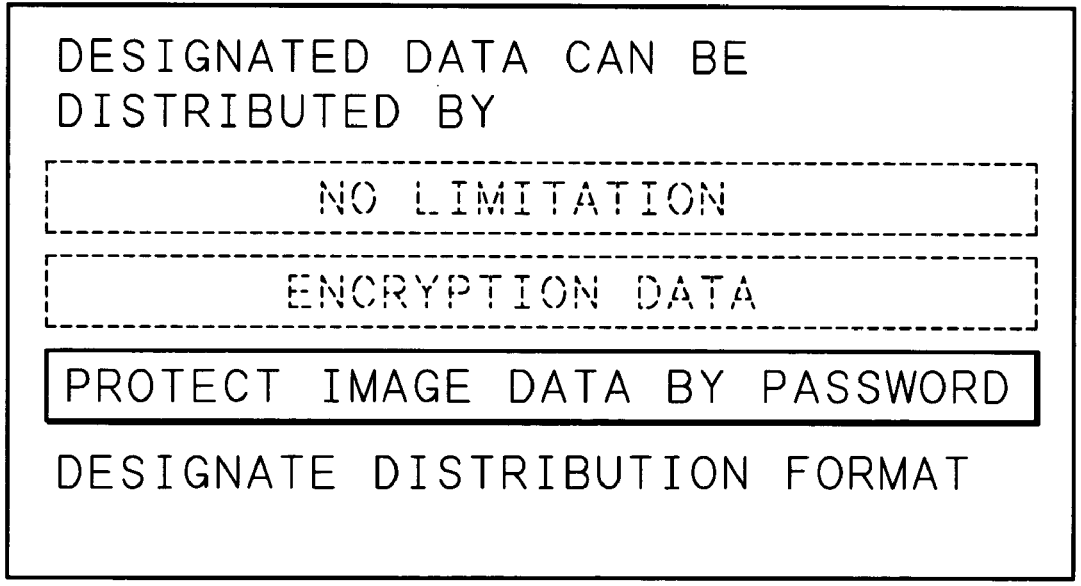

In the case that the data file format is selected via the touch panel shown in FIG. 9A, it is indicated that the data can be distributed in one of three formats, that is, one format wherein the data is not limited at all, another format wherein the data is encrypted and the other format wherein the data is converted into image data and protected by a predetermined password, as shown in FIGS. 10A and 10B. In the case that the designated data is the data having the condition information shown in FIG. 3 and that the user has been authenticated using his or her fingerprint and ID card, the data can be distributed in any one of the formats, as shown in FIG. 10A. According to this kind of display, the user can select a data distribution format on the touch panel. Furthermore, in the case that the user is authenticated only by his or her ID card, it is indicated that the data can be distributed only in the format wherein the data is converted into image data and protected by a predetermined password, as shown in FIG. 10B.

In the case that "printing" is selected on the touch panel shown in FIG. 9A or 9B, it is indicated that the image of the data can be recorded in one of four formats, that is, a first format wherein the image is not limited at all, a second format wherein the image is additionally provided with a tint block for copy prevention, a third format wherein the image is additionally provided with a tint block and reduced in size, and a fourth format wherein the image is additionally provided with a tint block, reduced in size and also reduced in resolution, as shown in FIGS. 11A and 11B. In the case that the designated data is the data having the condition information shown in FIG. 3 and that the user has been authenticated using his or her fingerprint and ID card, the image can be recorded in any one of the formats, as shown in FIG. 11A. The user can select a desired printing method on the touch panel. Furthermore, in the case that the user is authenticated only by his or her ID card, it is indicated that the image can be recorded only in the format wherein the image is additionally provided with a tint block and reduced in size or in the format wherein the image is additionally provided with a tint block, reduced in size and also reduced in resolution, as shown in FIG. 11B. However, the data distribution format is not limited to those exemplified using FIGS. 10A and 10B and FIGS. 11A and 11B. The data distribution format may have other data formats according to the user authentication method, such as formats wherein data is converted into various data formats and formats wherein a color image obtained from data is converted in color.

Next, the control section 21 monitors the reception of the distribution format designated at the operation section 24 operated by the user (at step S17). In the case that the designation of a distribution format is not received (NO at step S17), the control section 21 continuously monitors the reception of the distribution format designation. In the case that the designation of a distribution format is received (YES at step S17), the control section 21 causes the display device of the operation section 24 to display a data settlement method executable by the user (at step S18).

Figure 12A:
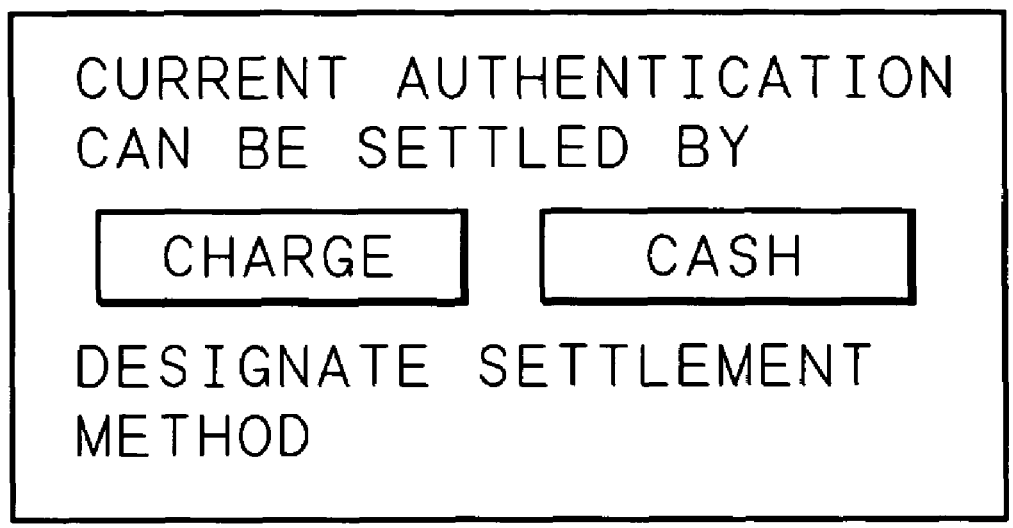
FIGS. 12A and 12B are schematic diagrams showing display examples of a data settlement method executable.
Figure 12B:
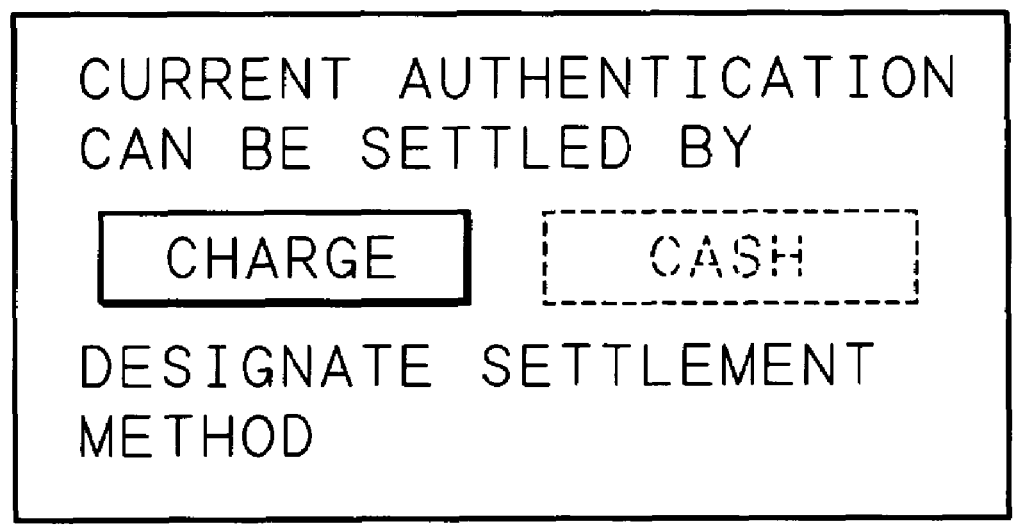

FIGS. 12A and 12B are schematic diagrams showing display examples of the data settlement method executable. The displays in the figures are examples displayed on the touch panel of the operation section 24. It is indicated that a data distribution fee can be settled using one of two methods, that is, a settlement method wherein the settlement is carried out by charging the distribution fee to the business establishment to which the user belongs and a settlement method wherein the settlement is carried out by prompt payment in cash. In the case that the designated data is the data having the condition information shown in FIG. 3 and that the user has been authenticated using his or her fingerprint and ID card, it is indicated that the settlement of the data distribution fee is possible using any one of the methods, that is, the settlement method wherein the settlement is carried out by charging the distribution fee to the business establishment and the settlement method wherein the settlement is carried out in cash, as shown in FIG. 12A. The user can select one method for settling the data distribution fee by designating "charge" or "cash" on the touch panel. Furthermore, in the case that the user is authenticated only by his or her ID card or password, it is indicated that only the settlement in cash is possible, as shown in FIG. 12B. However, the method for settling the data distribution fee is not limited to those exemplified above. The data distribution fee may be settled using other settlement methods according to the user authentication method, such as the use of a credit card and the use of withdrawal from an account.

Next, the control section 21 monitors the reception of settlement method designation at the operation section 24 operated by the user (at step S19). In the case that the designation of a settlement method is not received (NO at step S19), the control section 21 continuously monitors the reception of the settlement method designation. In the case that the designation of a settlement method is received (YES at step S19), the control section 21 judges whether data acquisition is ready or not, for example, whether the money receiving section 231 is ready to receive cash in the case of settlement in cash, or whether a semiconductor memory card or the like is connected to the interface section 232 and the interface section 232 is ready to output data in the case that the data is acquired as electronic data (at step S20). In the case that the data acquisition is not ready (NO at step S20), the control section 21 causes the display device of the operation section 24 to display predetermined information indicating that the data acquisition is urged to be ready, on the display device of the operation section 24, and stands by until the data acquisition is ready. In the case that the data acquisition is ready (YES at step S20), the control section 21 causes the communication section 25 to transmit information indicating the data distribution format and the settlement method to the data distribution apparatus 1 (at step S21).

The communication section 15 of the data distribution apparatus 1 receives the information indicating the data distribution format and the settlement method transmitted from the image recording apparatus 2 (at step S22). According to the designated data distribution format, the CPU 11 of the data distribution apparatus 1 generates data obtained by converting the format of data to be distributed (at step S23) and causes the communication section 15 to transmit the generated data to the image recording apparatus 2 (at step S24).

The communication section 25 of the image recording apparatus 2 receives the data transmitted from the data distribution apparatus 1 (at step S25). The control section 21 of the image recording apparatus 2 acquires the data using a method corresponding to the data distribution format by storing the received data in the semiconductor memory connected to the interface section 232 or by storing the image of the data in the image forming section 263 (at step S26). The data acquiring processing may be carried out by storing the data in a storage section 273. Next, the control section 21 carries out the charging processing of the data acquisition fee, for example, by calculating the charged amount for the data acquisition fee or by subtracting the distribution fee from the money having been received at the money receiving section 231 (at step S27). Next, the control section 21 causes the communication section 25 to transmit the charge information indicating the charged distribution fee to the data distribution apparatus 1 (at step S28).

The communication section 15 of the data distribution apparatus 1 receives the charge information transmitted from the image recording apparatus 2 (at step S29). The CPU 11 of the data distribution apparatus 1 carries out settlement processing, for example, by storing the charged amount in the internal storage section 14 (at step S30). Furthermore, the CPU 11 records the distribution results of the data and user authentication in a distribution-authentication result DB 145 and also records the result of the settlement in a settlement result DB146 (at step S31), and the processing ends. Information indicating the name and format of the distributed data, the name of the authenticated user, the authentication method used, etc. is recorded in the distribution-authentication result DB 145. Furthermore, information indicating the amount of the distribution fee settled, the settlement method used, etc. is recorded in the settlement result DB 146.

As described above, in the present invention, while multiple authentication methods are made usable for the authentication of the user at the time of data distribution, data is distributed in the format corresponding to the authentication method utilized, whereby the prevention of the unauthorized use of data and the improvement in the convenience of data utilization can be attained simultaneously. While multiple authentication methods being different in security against personal identity theft are made usable, in the case that an authentication method being high in security is used, data is distributed in changeable formats, and in the case that an authentication method being lower in security is used, data is distributed in a format changed so that the unauthorized use of data is difficult, whereby the unauthorized use of data can be prevented. Furthermore, provided that data has a format wherein the unauthorized use of data is difficult, even if the user is authenticated using a simpler method being low in security, data distribution is carried out, whereby more users can utilize data simply and easily, and the convenience of data utilization is improved.

In addition, in the present invention, user authentication is carried out using a combination of multiple authentication methods, whereby security against personal identity theft can be raised further. Furthermore, in the present invention, the format of data is changed to a data format wherein the contents of the data are unchangeable, the data to be distributed is protected using a password or the data format is changed by data encryption according to the authentication method, whereby it is possible to prevent the unauthorized use of data owing to personal identity theft in the case that an authentication method being low in security is used or owing to the case that a recording medium with stored data is left and stolen. Moreover, in the present invention, in the case that data is recorded as an image, a predetermined image, such as a tint block for copy prevention, is added according to the user authentication method, whereby the unauthorized use of data can be suppressed. Still further, in the present invention, in the case that data is recorded as an image, the image is converted in color, size or resolution according to the user authentication method, whereby it is possible to prevent the unauthorized use of data owing to personal identity theft in the case that an authentication method being low in security is used or owing to the case that an image recording medium is left and stolen. Still further, in the present invention, the result of user authentication and the distribution result of data are stored, whereby the utilization state of data can be managed.

Still further, in the present invention, a data distribution fee is settled using the settlement method corresponding to the user authentication method. In the case that an authentication method being high in security against personal identity theft is used, the settlement is carried out online, and in the case that an authentication method being lower in security is used, the settlement is carried out in cash, whereby the convenience of the settlement can be improved while the security against unauthorized settlement is ensured. Still further, in the present invention, the method of settling the data distribution fee is made known to the user, whereby the settlement amount of the distribution fee is confirmed by the user. Still further, in the present invention, the result of settlement of the data distribution fee is stored, whereby the settlement state of the distribution fee can be managed.

Still further, in this embodiment, the data distribution apparatus 1, a single apparatus, is used to carry out all processing operations ranging from data distribution, user authentication and distribution fee settlement. However, the present invention is not limited to have this configuration. It may be possible to use a configuration wherein multiple apparatuses connected to the communication network N are used to carry out the respective processing operations in a decentralized way.

Still further, in this embodiment, the configuration wherein the image recording apparatus 2 installed in the store S is used as the data acquisition apparatus in accordance with the present invention is described. However, the embodiment is not limited to have this configuration. The data acquisition apparatus may be another apparatus, such as a personal computer or a portable phone, to which data can be distributed from the data distribution apparatus 1 via the communication network N. Still further, in this embodiment, the image recording apparatus 2 serving as the data acquisition apparatus in accordance with the present invention has a configuration provided with the authentication information receiving section 22, such as a fingerprint receiving device. However, it is not necessary that all the image recording apparatuses 2, 2, . . . constituting the data distribution system are equipped with the authentication information receiving sections 22 having similar functions. Instead, the image recording apparatuses 2, 2, . . . may be equipped with the authentication information receiving sections 22 having functions different from one another. Still further, it may be possible to use a configuration wherein the image recording apparatus 2 being capable of carrying out authentication using only a password via the operation section 24 is used as a data acquisition apparatus and connected to the communication network N.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data distribution system, comprising a data distribution apparatus, provided with storage means in which data is stored, for distributing data stored in said storage means, and a data acquisition apparatus for acquiring the data distributed from said data distribution apparatus, wherein said data distribution apparatus comprises means for storing condition information indicating distribution conditions for respective data stored in said storage means, wherein said condition information includes a distribution format for the respective data so as to limit use of the data at a time when the respective data stored in said storage means is distributed, the distribution format being determined for the respective data in correspondence to each of multiple authentication methods for user authentication or a combination of the multiple authentication methods, said data acquisition apparatus comprises receiving means for receiving an authentication information of a user and a request for data distribution, and means for transmitting the authentication information and the request for data distribution received by said receiving means to said data distribution apparatus, and said data distribution apparatus comprises authenticating means for authenticating the user using the authentication method selected from among the multiple authentication methods and corresponding to the authentication information received from said data acquisition apparatus, selecting means for selecting the distribution format of the data which is determined in said condition information in correspondence to the authentication method used by said authenticating means for said data designated in the request for data distribution received from said data acquisition apparatus, and means for transmitting the data in the distribution format selected by said selecting means to said data acquisition apparatus in the case that the user is authenticated by said authenticating means.

2. A data distribution apparatus, provided with storage means in which data is stored, for distributing data stored in said storage means, comprising:

means for storing condition information indicating distribution conditions for respective data stored in said storage means, wherein said condition information includes a distribution format for the respective data so as to limit use of the data at a time when the respective data stored in said storage means is distributed, the distribution format being determined for the respective data in correspondence to each of multiple authentication methods for user authentication or a combination of the multiple authentication methods, authenticating means for authenticating a user using one of the multiple authentication methods;

selecting means for selecting the distribution format of data which is determined in said condition information in correspondence to the authentication method used by said authenticating means for said data to be distributed; and distributing means for distributing the data stored in said storage means in the distribution format selected by said selecting means to the outside in the case that the user is authenticated by said authenticating means.

3. The data distribution apparatus in accordance with claim 2, wherein said authenticating means carries out user authentication using one of multiple authentication methods being different in security against personal identity theft.

4. The data distribution apparatus in accordance with claim 2, wherein said authenticating means carries out user authentication using a combination of multiple authentication methods.

5. The data distribution apparatus in accordance with claim 2, further comprising means for converting the format of data to be distributed according to the result selected by said selecting means.

6. The data distribution apparatus in accordance with claim 2, further comprising means for protecting data to be distributed using a password according to the result selected by said selecting means.

7. The data distribution apparatus in accordance with claim 2, further comprising means for encrypting data to be distributed according to the result selected by said selecting means.

8. The data distribution apparatus in accordance with claim 2, wherein said distributing means distributes image data required when data to be distributed is recorded as an image, further comprising means for adding predetermined image data to said image data according to the result selected by said selecting means.

9. The data distribution apparatus in accordance with claim 2, wherein said distributing means distributes image data required when data to be distributed is recorded as an image, further comprising means for converting an image at least in color, size or resolution according to the result selected by said selecting means when said image data is recorded as an image.

10. The data distribution apparatus in accordance with claim 2, further comprising means for storing the result of user authentication carried out by said authenticating means and the distribution result of data stored in said storage means.

11. The data distribution apparatus in accordance with claim 2, further comprising settling means for settling the distribution fee for the data distribution carried out by said distributing means according to a settlement method corresponding to the authentication method carried out by said authenticating means.

12. The data distribution apparatus in accordance with claim 11, further comprising means for informing the settlement method carried out by said settling means to the outside.

13. The data distribution apparatus in accordance with claim 11, further comprising means for storing the result of settlement of said distribution fee carried out by said settling means.

14. A data distribution system, comprising:
a data distribution apparatus for distributing data;
a data acquisition apparatus for acquiring data distributed from said data distribution apparatus; and
a communication network to which said data distribution apparatus and said data acquisition apparatus are connected;
said data distribution apparatus including:
a storage section in which data is stored, and
a condition information storage section for storing condition information indicating distribution conditions for respective data stored in said storage means, wherein said condition information includes a distribution format for the respective data so as to limit use of the data at a time when the respective data stored in said storage means is distributed, the distribution format being determined for the respective data in correspondence to each of multiple authentication methods for user authentication or a combination of the multiple authentication methods;
said data acquisition apparatus including:
a reception section for receiving an authentication information of a user and a request for data distribution, and
a transmission section for transmitting the authentication information and the request for data distribution received by said reception section to said data distribution apparatus; and
said data distribution apparatus including:
a storage section in which data is stored,
a reception section for receiving the authentication information and the request for data distribution from said data acquisition apparatus,
a controller capable of performing the following operations:
   (i) authenticating the user using the authentication method selected from among the multiple authentication methods and corresponding to the authentication information received from said data acquisition apparatus; and
   (ii) selecting the distribution format of data which is determined in said condition information in correspondence to the authentication method used for said data designated in the request for data distribution received from said data acquisition apparatus; and
a transmission section for transmitting the data in the selected distribution format to said data acquisition apparatus in the case that the user is authenticated.

15. A data distribution apparatus, comprising:
a storage section in which data is stored;
a condition information storage section for storing condition information indicating distribution conditions for respective data stored in said storage means, wherein said condition information includes a distribution format for the respective data so as to limit use of the data at a time when the respective data stored in said storage means is distributed, the distribution format being determined for the respective data in correspondence to each of multiple authentication methods for user authentication or a combination of the multiple authentication methods;
a controller capable of performing the following operations:
   (i) authenticating a user using one of the multiple authentication methods; and
   (ii) selecting the distribution format of data which is determined in said condition information in correspondence to the authentication method used for said data to be distributed; and
a distribution section for distributing the data stored in said storage section in the selected format to the outside in the case that the user is authenticated.

* * * * *